Figure 1:
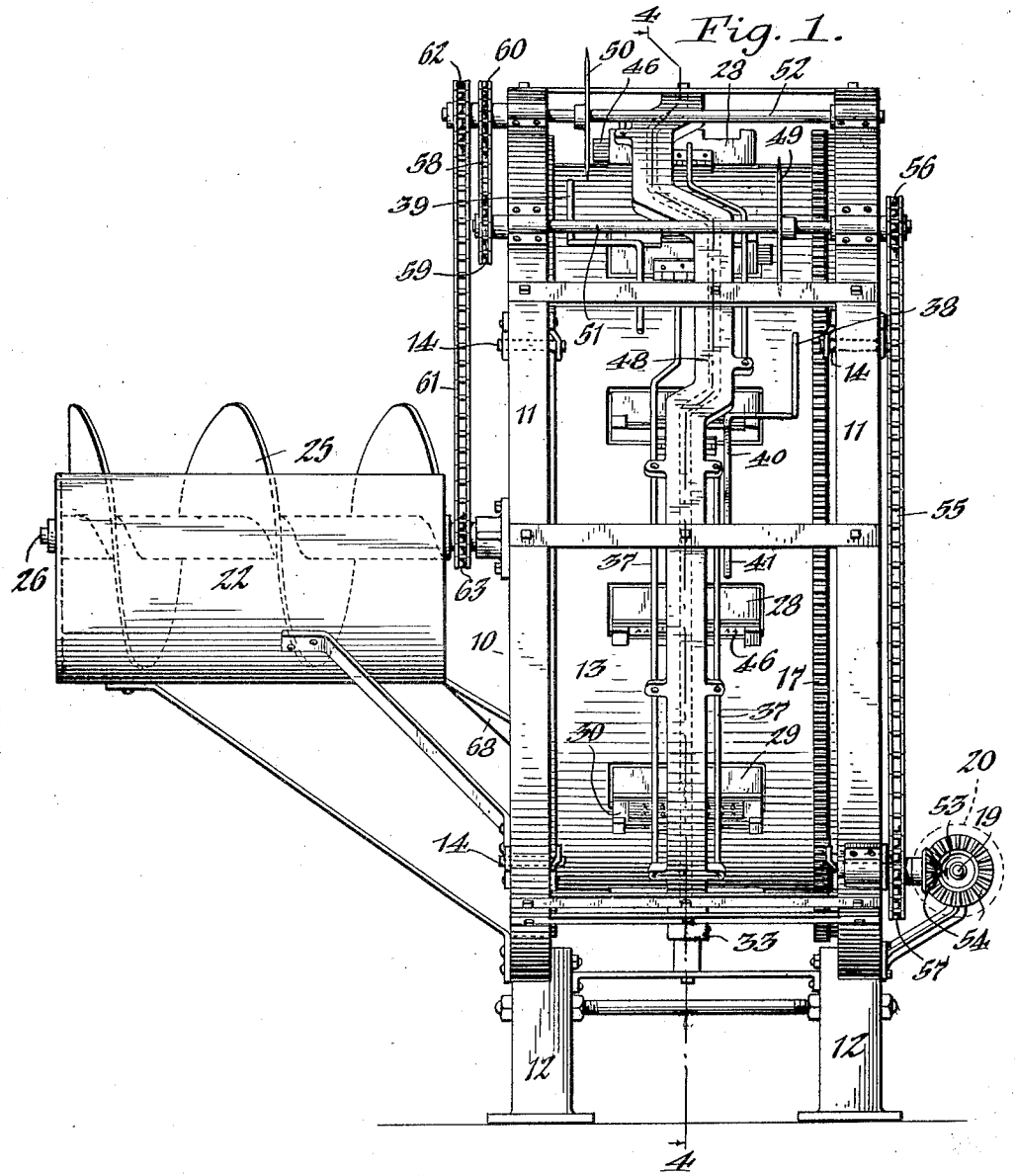

H. J. WHEELER.
MACHINE FOR TRIMMING THE ENDS OF ARTICLES.
APPLICATION FILED FEB. 20, 1920.

1,346,288. Patented July 13, 1920.
4 SHEETS—SHEET 1.

Inventor,
Henry J. Wheeler
by
Attorneys.

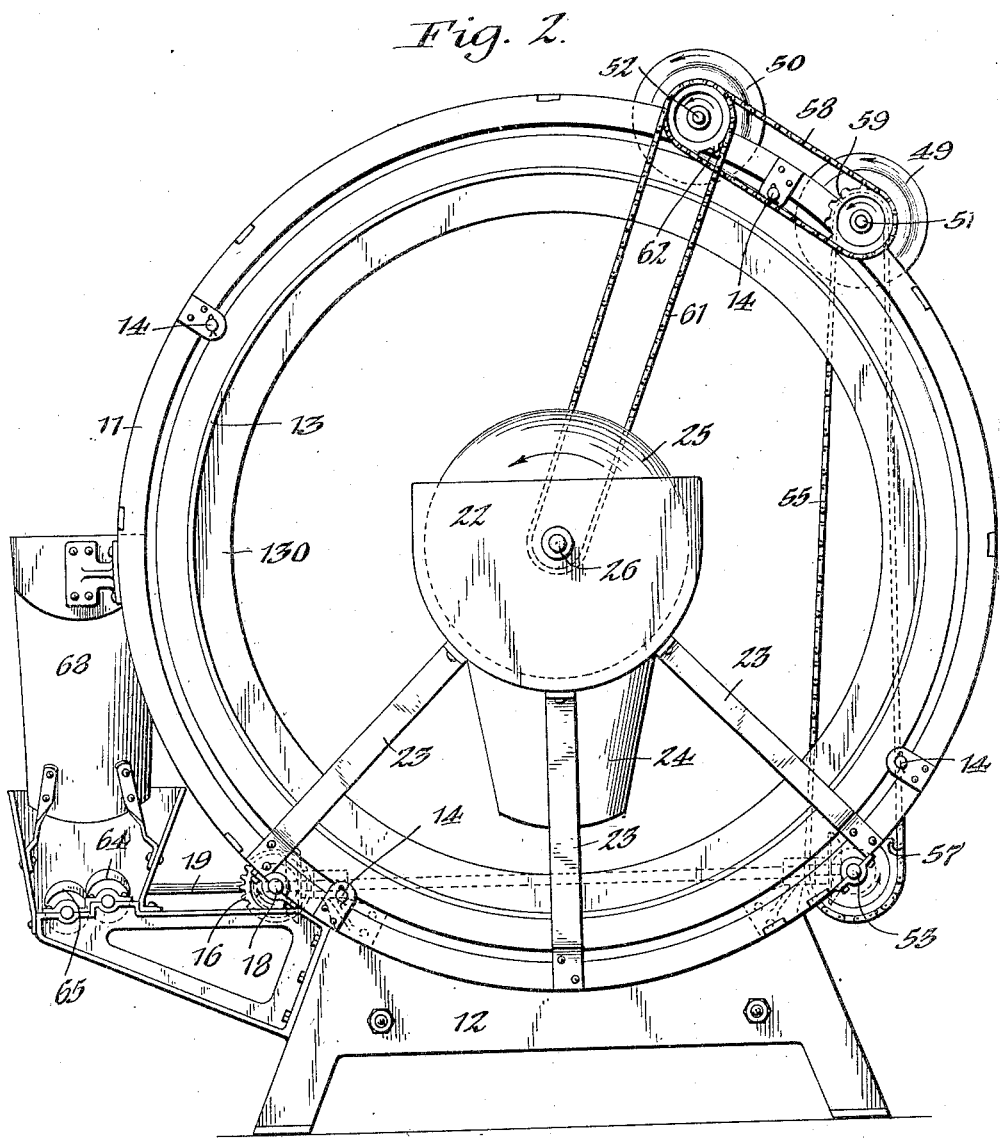

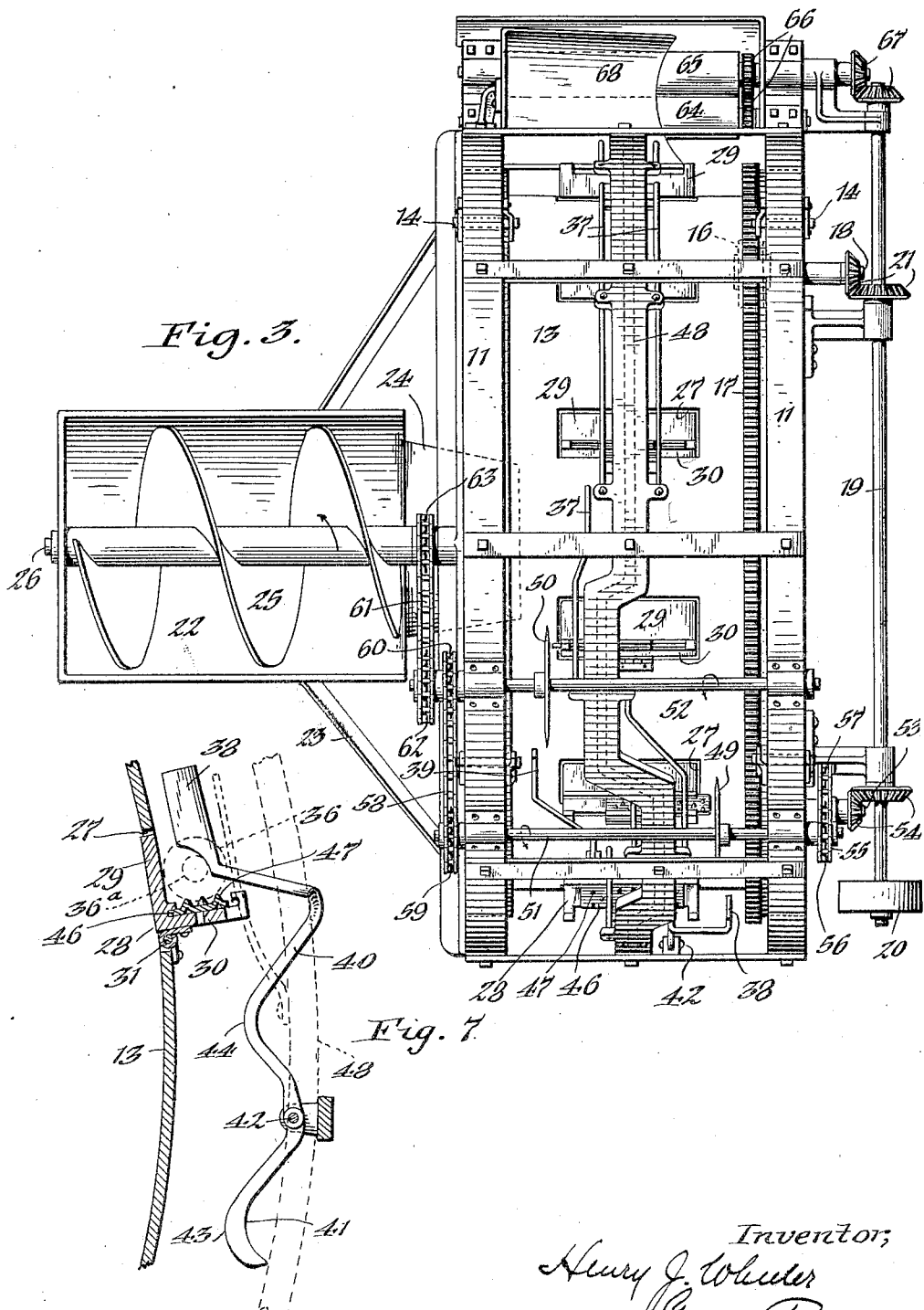

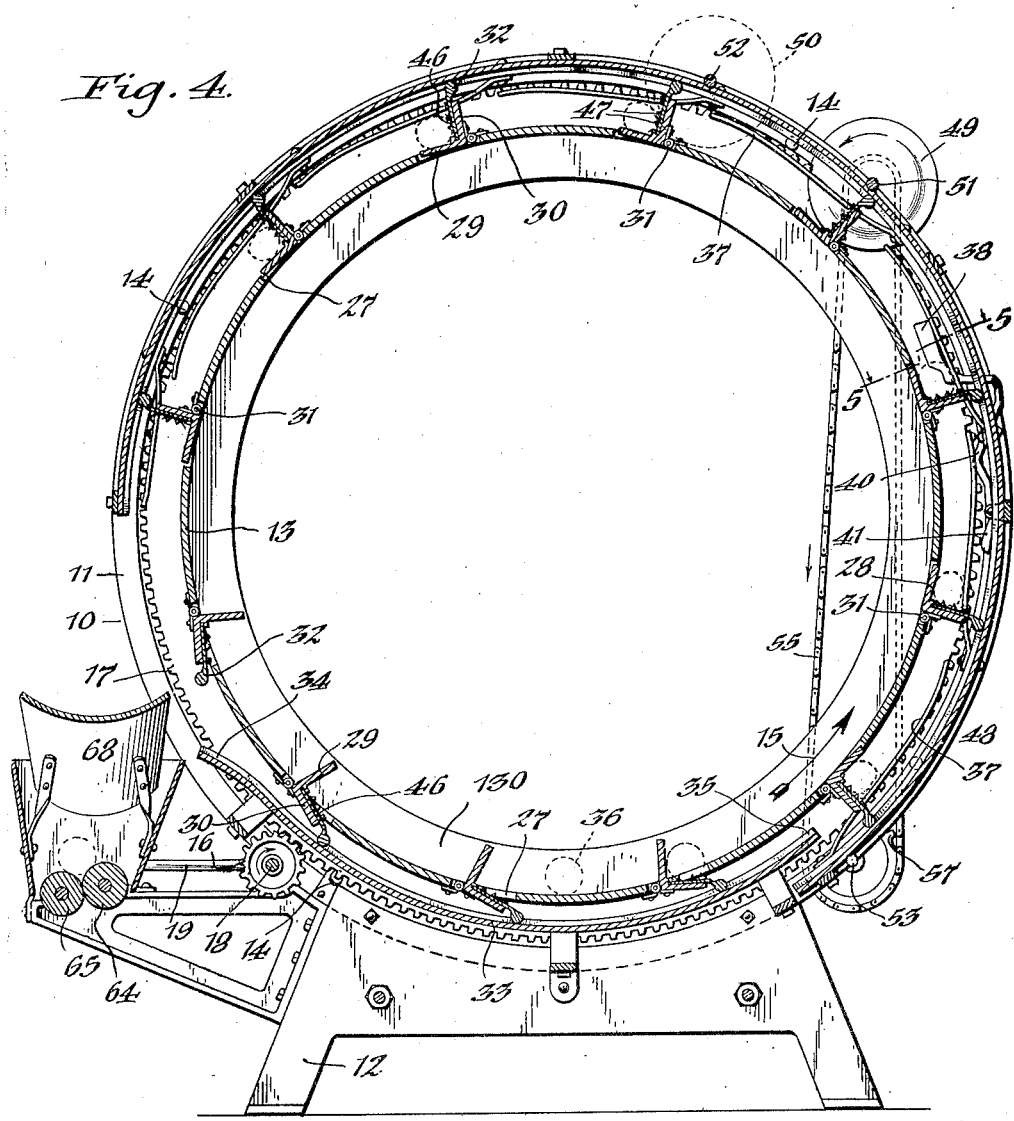

UNITED STATES PATENT OFFICE.

HENRY J. WHEELER, OF BUFFALO, NEW YORK.

MACHINE FOR TRIMMING THE ENDS OF ARTICLES.

1,346,288.  Specification of Letters Patent.  Patented July 13, 1920.

Application filed February 20, 1920. Serial No. 360,129.

*To all whom it may concern:*

Be it known that I, HENRY J. WHEELER, a citizen of the United States, residing in Buffalo, in the county of Erie and State of New York, have invented new and useful Improvements in Machines for Trimming the Ends of Articles, of which the following is a specification.

This invention relates to a machine for trimming off the ends of articles such for instance as green corn before the husks are removed therefrom preparatory to cutting off the kernels from the cob, such a machine being particularly useful in canning factories where green corn is packed in large quantities for cooking purposes.

The object of this invention is to produce a machine which will properly trim a large quantity of corn ears expeditiously and economically and with a minimum expenditure of power.

In the accompanying drawings:

Figure 1 is a side elevation of the trimming machine embodying a suitable form of my invention. Fig. 2 is a front end elevation of the same. Fig. 3 is a top plan view thereof. Fig. 4 is a cross section of the same taken on line 4—4, Fig. 1. Fig. 5 is a fragmentary horizontal section, on an enlarged scale, taken on line 5—5, Fig. 4. Figs. 6 and 7 are fragmentary vertical sections taken on the correspondingly numbered lines in Fig. 5.

Similar characters of reference refer to like parts throughout the several views.

10 represents the main frame of the machine which may be of any suitable construction but preferably comprises two upright rings 11, 11 arranged at opposite ends of the frame and legs 12 whereby said rings are supported on the floor.

Arranged within the rings of the frame is a carrier 13 which preferably has the form of a horizontal cylinder or drum and rotates about its horizontal longitudinal axis. This carrier is preferably constructed of sheet metal with its opposite ends open and the same is rotatably supported within the frame by rollers 14 mounted on the frame and engaging the exterior of the carrying drum on opposite sides of a vertical plane extending lengthwise of the axis of the carrier. This drum may be rotated in the direction of the arrow 15 by means which comprise a gear pinion 16 meshing with an annular gear rim 17 mounted on the exterior of the carrier, a horizontal shaft 18 carrying said gear pinion and journaled lengthwise in a suitable bearing on the main frame, and a main horizontal driving shaft 19 journaled transversely in bearing on the rear end of the main frame and provided with a driving pulley 20 and operatively connected by a pair of bevel gear wheels 21 with the rear end of the shaft 18, as best shown in Figs. 3 and 4.

The green corn to be trimmed or cut off at its ends is fed into the front end of the carrier or drum and deposited on the bottom thereof, this being accomplished for instance by a feed device consisting of a horizontal trough 22 mounted by brackets 23 on the front part of the main frame so that the trough is arranged with its open rear end near the central part of the front end of the drum or carrier, a chute 24 extending from the rear end of the trough toward the bottom of the drum, and a rotary screw conveyer or worm 25 arranged lengthwise in the trough and mounted on a shaft 26 which is journaled in bearings on the trough. The green corn to be trimmed and husked is delivered indiscriminately *en masse* into the trough or hopper 22 and delivered in a stream from the latter to the bottom of the drum by the conveyer 25.

After the ears of corn are deposited on the bottom of the drum the same are successively carried upwardly on the rising inner side of this drum, then passed from the interior to the exterior of the drum, and then presented to the means which operate to gage the ears at their ends and cut off these ends preparatory to delivering the ears to the devices which remove the husks from the kernel bearing cobs. For the purpose of thus permitting the ears to be transferred from the inner to the outer side of the drum the latter is provided with a plurality of longitudinal slots or openings 27 which are arranged in an annular row. Within each of these slots is mounted a bucket 28 which operates as part of the means for moving an ear upwardly on the interior of the rising side of the drum, also as part of the means for transferring the ear through the respective opening in the drum to the exterior thereof and also as part of the means for causing the ear to continue its movement with the drum on the exterior thereof until the ear is gaged or positioned and trimmed, and finally discharged to the husking mechanism. This bucket is L-shaped in cross section so as to form inner and outer wings or flights 29, 30 and the same is pivoted at its corner to the drum adjacent to the rear edge of the opening 27 by a hinge 31 which is constructed to limit the rocking movement of the bucket so that when the bucket is turned inwardly its inner wing will project inwardly from the inner side of the drum and its outer wing will close or obstruct the opening 27, as shown on the lowermost part of the drum in Fig. 4, while upon turning the bucket outwardly the inner wing thereof will close or obstruct the opening 27 and the outer wing thereof will project laterally outwardly from the exterior of the drum. The buckets are moved into their inwardly turned position and held there while on the lowermost part of the drum by a controlling arm 32 arranged on the outer wing of the bucket and engaging a retaining rail,—the main or body portion 33 of which is arranged below the lower part of the drum and in a concentrically spaced relation thereto, the front end 34 of said rail being deflected outwardly to form a cam and the rear end 35 terminating abruptly. It follows from this construction that as each bucket is about to pass along the lower part of the drum the controlling arm of the bucket engages with the cam portion 34 at the front end of the retaining rail and lifted upon the concentric body portion 33 thereof. Inasmuch as the bucket just prior to reaching the retaining rail was held by gravity in an inwardly turned position the engagement of the controlling arm with the retaining rail operates to hold the bucket in this position while passing along the lower part of the drum. Therefore any ears of corn 36 which at this time may be lying on the interior of the bottom part of the drum will roll into buckets and be carried across the bottom of the drum toward the rising side of the drum by the inwardly projecting inner wing of the bucket. To confine the ears of corn discharged from the hopper 24 in the path of the bucket 28 revolving with the drum 13, guide rails 130 are arranged circumferentially on the inner side of the latter and on either side of the openings 27 therein, thereby preventing the ears from falling out of the drum. After the bucket has passed to one side of the lowermost part of the drum and reaches that part of the latter which rises rapidly the controlling arm of the bucket drops off the abrupt rear end of the retaining rail which causes the bucket to turn outwardly by gravity into a position in which the inner wing of the same closes the respective opening 27 and the outer wing thereof projects laterally from the drum. During the outward turning movement of the bucket the ear of corn lying in the bucket is carried from the interior of the drum through the opening 27 to the exterior thereof and thereafter the ear is propelled by the outer wing of the bucket until it is delivered to the husking mechanism.

The bucket is held in this outwardly turned position and the ear is confined therein by a plurality of retaining springs 37 which are arranged circumferentially around the path of the buckets and engage either with the outer side of the ear of corn, if one is in the bucket, or with the outer wing of the bucket, if the same is empty. Each of these springs is secured at its rear end to a stationary part of the machine while its front end is free to permit the same to adapt itself to the bucket and size of ear.

As each ear is carried upwardly on the rising side of the drum the ear is first moved lengthwise in one direction by a positioning device for engaging one end thereof with a gage 38 preparatory to trimming off the respective end of the ear and the latter is moved lengthwise in the opposite direction by another positioning device for engaging the opposite end of the ear with another gage 39 preparatory to trimming off the other end of said ear. These gages are arranged adjacent to opposite sides of the path of the buckets and ears of corn and at different points relative to the circumference of the drum and as the construction and operation of the same is alike the following description will apply to both:

40 and 41 represent the front setting arm and the rear restoring arm of a shifting lever which operates each gage and which is pivoted by a horizontal longitudinal pin 42, or otherwise, to a stationary part of the frame. The restoring arm is provided with a cam face 43 which is adapted to be engaged by a tappet, such for instance as the outer edge of the outer wing of each bucket and be turned thereby so that the respective gage is moved by the companion setting arm inwardly across the path of one end of the ears of corn before the latter reaches the gaging position. Thereafter the ear during its continued forward motion engages a cam face 44 on the setting arm 40 of the shifting lever and pushes this arm outwardly from the drum together with the respective gage. The outward movement of the setting arm by the ear of corn causes the respective gage to be carried laterally outward into a position in which the gage is arranged on one side of the axis of the ear so that when the latter is subsequently moved lengthwise of its axis that part of the shoulder or breast of the ear immediately adjacent to the axis of the same will contact with the respective gage and cause the same to be positioned properly for removing the right length from this end of the ear by the cutter or knife which subsequently operates on the same. In Fig. 5 the breast or stub end of the ear is represented in engagement with the gage on one side of the stub 36ª of the ear but if the ear is reversed the shoulder between the tip 45 of the ear and the body thereof engages in like manner with the gage. By this means the gage is always shifted into a position determined by the thickness or diameter of the ear so that either end of the ear may be gaged for cutting off the proper length from the end thereof for loosening the husks and facilitating their subsequent removal by the husking mechanism.

After each gage has been shifted into the proper position relative to the end of the ear the latter is moved lengthwise of its bucket for engaging the breast or shoulder of the ear with said gage before presenting the respective end of the ear to the cutter which is adapted to sever the same. The longitudinal shifting device in its preferred form comprises a shifting plate 46 guided to move lengthwise on the face of the outer wing of each bucket and provided on its front side with spurs 47 whereby the same may obtain a grip or hold on the ear resting thereon and cause the same to move with said plate. The shifting plate is moved by the shifting or controlling arm 32 heretofore mentioned which engages with a positioning cam 48 arranged circumferentially about the drum from a point adjacent to where the retaining rail terminates to the place where the trimmed ears are discharged and delivered to the husking mechanism. The cam 48 by its engagement with the shifting arm 32 also operates to hold the bucket in its outwardly turned position independently of the holding springs 37, thereby holding the buckets in an outwardly turned position and permitting the ears of corn to drop out of the same by gravity after the buckets have passed downwardly below the last set of springs 37, on the discharging side of the machine. This positioning cam is so constructed that immediately after the first gage has been set the ear is moved from a central position lengthwise in one direction for engaging one end of the ear against the respective end, and then retains the ear in this position until that end of the ear has been cut off and the gage for the opposite end of the ear has been set. Thereafter the ear is moved lengthwise in the opposite direction for engaging the other end of the ear with the second gage and is retained in this position until the other end of the ear has been severed after which the ear is again moved lengthwise into its central position and retained there until discharged from the trimming mechanism.

The retaining springs 37 adjacent to the gaging devices preferably are so constructed that they exert no pressure against the ears of corn while the same are being moved lengthwise by shifting plates 46, thus avoiding interference with the proper contact of the ears with the gages.

The cutters or knives which sever the ends of the ears after the same have been gaged or positioned may be variously constructed but the same preferably consist of two rotary cutter disks 49, 50, which are arranged immediately in advance of the respective gaging device on a line adjacent to that side of the gage which faces the end of the ear of corn and in the path of the latter. These cutter disks are mounted on horizontal shafts 51, 52, which are journaled lengthwise on the main frame at different points circumferentially of the drum. The means shown in the drawings for rotating these cutters comprise a short horizontal shaft 53 journaled lengthwise on the lower part of the main frame and driven from the main shaft 19 by a pair of bevel gear wheels 54, a chain belt 55 passing around sprocket wheels 56, 57 on the shafts 51 and 53, and a chain belt 58 passing around sprocket wheels 59, 60 on the shafts 51, 52.

The screw conveyer is preferably driven by a chain belt 61 passing around sprocket wheels 62, 63, on the shafts 52 and 26, respectively.

The positioning cam 48 and the retaining springs 37 terminate on the descending side of the drum or rotary carrier and as each bucket and its controlling arm 32 passes downwardly beyond this cam 48 and the springs 37 then the bucket turns inwardly by gravity due to its own weight and that of the ear resting therein, thereby releasing the ear and discharging the same from the bucket leaving the latter free to pass the lower part of the drum under the control of the retaining rail 33 preparatory to beginning another cycle of operations.

As the ears are discharged from the trimming mechanism they may be operated upon by a husking device of any suitable character for removing the husks therefrom. The husking mechanism shown in the drawings is typical of one suitable for this purpose and comprises a pair of parallel husking rollers 64, 65 which are caused to turn downwardly with their opposing sides by intermeshing gear wheels 66, 66 applied to the corresponding ends and a pair of intermeshing gear wheels 67 connecting the shaft of one of the husking rollers with the driving shaft 19.

The trimmed ears of corn are conducted from the point of discharge of the trimming mechanism to the husking machine by a chute 68 and as the ears pass lengthwise over the husking rollers, the husks are removed therefrom.

The chief advantage of this machine is its large capacity and the fact that the positioning of the ears is effected automatically thus permitting of dumping the corn promiscuously into the conveyer trough and dispensing with the use of hand labor for approximately positioning the ears of corn preparatory to cutting the ends of the same as has been the custom heretofore.

Furthermore the capacity of this machine is materially increased by reason of the fact that the trimming of ears is done efficiently regardless of whether the tip or butt end of the ears project forwardly or backwardly in the buckets.

Another advantage in this machine is that by multiplying the number of units of which that shown in the drawings is one and arranging such units lengthwise in line a machine of any desired capacity may be produced.

I claim as my invention:

1. A machine for trimming the ends of articles comprising a circular carrier rotatable about a horizontal axis and provided with a plurality of openings arranged in an annular row, means for transferring the articles to be trimmed from the interior to the exterior of said carrier through said openings thereof, and cutting means which are arranged adjacent to the exterior of said carrier and past which said articles are propelled by the propulsion of said carrier.

2. A machine for trimming the ends of articles comprising a circular carrier rotatable about a horizontal axis and provided with a plurality of openings arranged in an annular row, means for transferring the articles to be trimmed from the interior to the exterior of said carrier through said openings thereof comprising a plurality of L-shaped buckets each of which is pivoted on said carrier within one of said openings so as to be capable of turning about an axis parallel with that of the carrier, and means for turning said bucket on said carrier so that at one time the inner wing thereof projects inwardly from the carrier and operates to propel the articles circumferentially on the inner side of the carrier and in another position the outer wing of the same projects outwardly from the carrier and operates to carry the articles around the exterior of the carrier.

3. A machine for trimming the ends of articles comprising a circular carrier rotatable about a horizontal axis and provided with a plurality of openings arranged in an annular row, means for transferring the articles to be trimmed from the interior to the exterior of said carrier through said openings thereof comprising a plurality of L-shaped buckets each of which is pivoted on said carrier within one of said openings so as to be capable of turning about an axis parallel with that of the carrier, means for turning said bucket on said carrier so that at one time the inner wing thereof projects inwardly from the carrier and operates to propel the articles circumferentially on the inner side of the carrier and in another position the outer wing of the same projects outwardly from the carrier and operates to carry the articles around the exterior of the carrier, and gaging and cutting mechanisms past which said articles are carried while on the exterior of the carrier.

4. A machine for trimming the ends of articles comprising a circular carrier rotatable about a horizontal axis and provided with a plurality of openings arranged in an annular row, means for transferring the articles to be trimmed from the interior to the exterior of said carrier through said openings thereof comprising a plurality of L-shaped buckets each of which is pivoted on said carrier within one of said openings so as to be capable of turning about an axis parallel with that of the carrier, means for turning said bucket on said carrier so that at one time the inner wing thereof projects inwardly from the carrier and operates to propel the articles circumferentially on the inner side of the carrier and in another position the outer wing of the same projects outwardly from the carrier and operates to carry the articles around the exterior of the carrier, and means for limiting the swinging motion of said buckets on said carrier.

5. A machine for trimming the ends of articles comprising a circular carrier rotatable about a horizontal axis and provided with a plurality of openings arranged in an annular row, means for transferring the articles to be trimmed from the interior to the exterior of said carrier through said openings thereof comprising a plurality of L-shaped buckets each of which is pivoted on said carrier within one of said openings so as to be capable of turning about an axis parallel with that of the carrier, means for turning said bucket on said carrier so that at one time the inner wing thereof projects inwardly from the carrier and operates to propel the articles circumferentially on the inner side of the carrier and in another position the outer wing of the same projects outwardly from the carrier and operates to carry the articles around the exterior of the carrier, means for moving the articles lengthwise on the outer wings of said buckets, gages against which said articles are positioned when moved lengthwise of said buckets, and cutting devices past which said articles are propelled by said buckets circumferentially after being positioned.

6. A machine for trimming the ends of articles comprising a circular carrier rotatable about a horizontal axis and provided with a plurality of openings arranged in an annular row, means for transferring the articles to be trimmed from the interior to the exterior of said carrier through said openings thereof comprising a plurality of L-shaped buckets each of which is pivoted on said carrier within one of said openings so as to be capable of turning about an axis parallel with that of the carrier, means for turning said bucket on said carrier so that at one time the inner wing thereof projects inwardly from the carrier and operates to propel the articles circumferentially on the inner side of the carrier and in another position the outer wing of the same projects outwardly from the carrier and operates to carry the articles around the exterior of the carrier, a positioning plate slidable lengthwise on the outer wing of each bucket for positioning the article resting thereon, a gage against which said article is moved by said positioning plate, and a cutting device past which said article is carried by said bucket after the same is positioned against said gage.

7. A machine for trimming the ends of articles comprising a circular carrier rotatable about a horizontal axis and provided with a plurality of openings arranged in an annular row, means for transferring the articles to be trimmed from the interior to the exterior of said carrier through said openings comprising a plurality of L-shaped buckets each of which is pivoted on said carrier within one of said openings so as to be capable of turning about an axis parallel with that of the carrier, means for turning said bucket on said carrier so that at one time the inner wing thereof projects inwardly from the carrier and operates to propel the articles circumferentially on the inner side of the carrier and in another position the outer wing of the same projects outwardly from the carrier and operates to carry the articles around the exterior of the carrier, a positioning plate slidable lengthwise on the outer wing of each bucket for positioning the article resting thereon, a gage against which said article is moved by said positioning plate, and a cutting device past which said article is carried by said bucket after the same is positioned against said gage, said plate being provided on its face with spurs for engaging said article.

8. A machine for trimming the ends of articles comprising a circular carrier rotatable about a horizontal axis and provided with a plurality of openings arranged in an annular row, means for transferring the articles to be trimmed from the interior to the exterior of said carrier through said openings thereof comprising a plurality of L-shaped buckets each of which is pivoted on said carrier within one of said openings so as to be capable of turning about an axis parallel with that of the carrier, means for turning said bucket on said carrier so that at one time the inner wing thereof projects inwardly from the carrier and operates to propel the articles circumferentially on the inner side of the carrier and in another position the outer wing of the same projects outwardly from the carrier and operates to carry the articles around the exterior of the carrier, a positioning plate slidable lengthwise on the outer wing of each bucket for positioning the article resting thereon, a gage against which said article is moved by said positioning plate, a cutting device past which said article is carried by said bucket after the same is positioned against said gage, and means for moving said positioning plate lengthwise comprising a stationary cam arranged circumferentially of the carrier, and a shifting arm arranged on the positioning plate and movable into and out of engagement with said cam.

9. A machine for trimming the ends of articles comprising a circular carrier rotatable about a horizontal axis and provided with a plurality of openings arranged in an annular row, means for transferring the articles to be trimmed from the interior to the exterior of said carrier through said openings thereof comprising a plurality of L-shaped buckets each of which is pivoted on said carrier within one of said openings so as to be capable of turning about an axis parallel with that of the carrier, means for turning said bucket on said carrier so that at one time the inner wing thereof projects inwardly from the carrier and operates to propel the articles circumferentially on the inner side of the carrier and in another position the outer wing of the same projects outwardly from the carrier and operates to carry the articles around the exterior of the carrier, and retaining springs arranged to be engaged by said buckets for yieldingly holding the same in an outwardly turned position.

10. A machine for trimming the ends of articles comprising a circular carrier, buckets mounted on said carrier and adapted to propel the articles circumferentially relatively to the carrier, means for moving the articles lengthwise of the buckets, a gage against which an end of each article is moved lengthwise, and means for varying the position of said gage transversely of the axis of said articles and controlled by the diameter of the article which is being gaged, and a cutting device past which the gaged end of the article is moved after the gaging operation.

11. A machine for trimming the ends of articles comprising a circular carrier, buckets mounted on said carrier and adapted to propel the articles circumferentially relatively to the carrier, means for moving the articles lengthwise of the buckets, a gage against which an end of each article is moved lengthwise, a setting arm carrying said gage and adapted to be shifted by engaging with the side of the articles for moving the gage transversely past the end of the same, and a cutting device past which the gaged end of the article is moved after the gaging operation.

12. A machine for trimming the ends of articles comprising a circular carrier, buckets mounted on said carrier and adapted to propel the articles circumferentially relatively to the carrier, means for moving the articles lengthwise of the buckets, a gage against which an end of each article is moved lengthwise, a setting arm carrying said gage and adapted to be shifted by engaging with the side of the articles for moving the gage transversely past the end of the same, a restoring arm associated with said gage and adapted to be shifted by engagement with one of said buckets for moving the gage transversely across the path of said article, and a cutting device past which the gaged end of the article is moved after the gaging operation.

13. A machine for trimming the ends of articles comprising a circular carrier rotatable about a horizontal axis, buckets for carrying the articles circumferentially around said carrier, means for gaging and trimming the ends of said articles while moving around one side of the carrier, and means for discharging the articles from the opposite side of the carrier.

14. A machine for trimming the ends of articles comprising a circular carrier rotatable about a horizontal axis, buckets for carrying the articles circumferentially around said carrier, means for gaging and trimming the ends of said articles while moving around one side of the carrier, means for discharging the articles from the opposite side of the carrier, and means for feeding into the carrier the articles to be trimmed.

15. A machine for trimming the ends of articles comprising a circular carrier rotatable about a horizontal axis, buckets for carrying the articles circumferentially around said carrier, means for gaging and trimming the ends of said articles while moving around one side of the carrier, means for discharging the articles from the opposite side of the carrier, and means for feeding into the carrier the articles to be trimmed comprising a trough opening into the interior of the carrier, and a screw propeller arranged within the trough.

16. A machine for trimming the ends of articles comprising a circular carrier rotatable about a horizontal axis, buckets for carrying the articles circumferentially around said carrier, means for gaging and trimming the ends of said articles while moving around one side of the carrier, means for discharging the articles from the opposite side of the carrier, and a main frame in which said carrier is rotatably supported.

17. A machine for trimming the ends of articles comprising a circular carrier rotatable about a horizontal axis, buckets for carrying the articles circumferentially around said carrier, means for gaging and trimming the ends of said articles while moving around one side of the carrier, means for discharging the articles from the opposite side of the carrier, a main frame in which said carrier is rotatably supported, and means for rotating said carrier comprising an annular gear rim mounted on said carrier and a driving gear pinion meshing with said gear rim.

18. A machine for trimming the ends of articles comprising a circular carrier rotatable about a horizontal axis and provided with a plurality of openings arranged in an annular row, guide rails arranged circumferentially on opposite sides of said openings, means for propelling the articles to be trimmed circumferentially of the carrier and from the interior to the exterior thereof through said openings, and a cutting device arranged adjacent to the carrier and past which said articles are propelled.

HENRY J. WHEELER.